United States Patent [19]

Gladstone

[11] Patent Number: 4,827,726

[45] Date of Patent: May 9, 1989

[54] METHOD OF AND ARRANGEMENT FOR GENERATING HYDROGEN

[76] Inventor: Ernest Gladstone, 721 Avenue O, Brooklyn, N.Y. 11230

[21] Appl. No.: 72,919

[22] Filed: Jul. 14, 1987

[51] Int. Cl.$^4$ .............................................. F17C 11/00
[52] U.S. Cl. ...................................... 62/48.2; 423/657
[58] Field of Search ............... 62/48; 423/644, 648 R, 423/657

[56] References Cited

U.S. PATENT DOCUMENTS

| | | | |
|---|---|---|---|
| 3,490,871 | 1/1970 | Miller et al. | 423/657 |
| 3,540,485 | 11/1970 | Kummins | 423/657 |
| 4,155,712 | 5/1979 | Taschek | 423/657 |
| 4,161,211 | 7/1979 | Duffy et al. | 62/48 |
| 4,178,987 | 12/1979 | Bowman et al. | 62/48 |
| 4,216,199 | 8/1980 | Erickson | 423/657 |
| 4,261,955 | 4/1981 | Baily Jr. et al. | 423/657 |
| 4,433,633 | 2/1984 | Caudy et al. | 423/657 |

Primary Examiner—Ronald C. Capossela
Attorney, Agent, or Firm—Kirschstein, Kirschstein, Ottinger & Israel

[57] ABSTRACT

An arrangement for and method of generating hydrogen wherein hydrogen and hydroride are generated by reacting hydrogen hydride with water. The hydrogen hydride is generated by subjecting hydroride to cryogenic temperature and subatmospheric pressure conditions. This cycle is repeated with the resulting liberation of hydrogen. The hydroride is produced initially and as needed by subjecting water to the action of light photons.

20 Claims, 1 Drawing Sheet

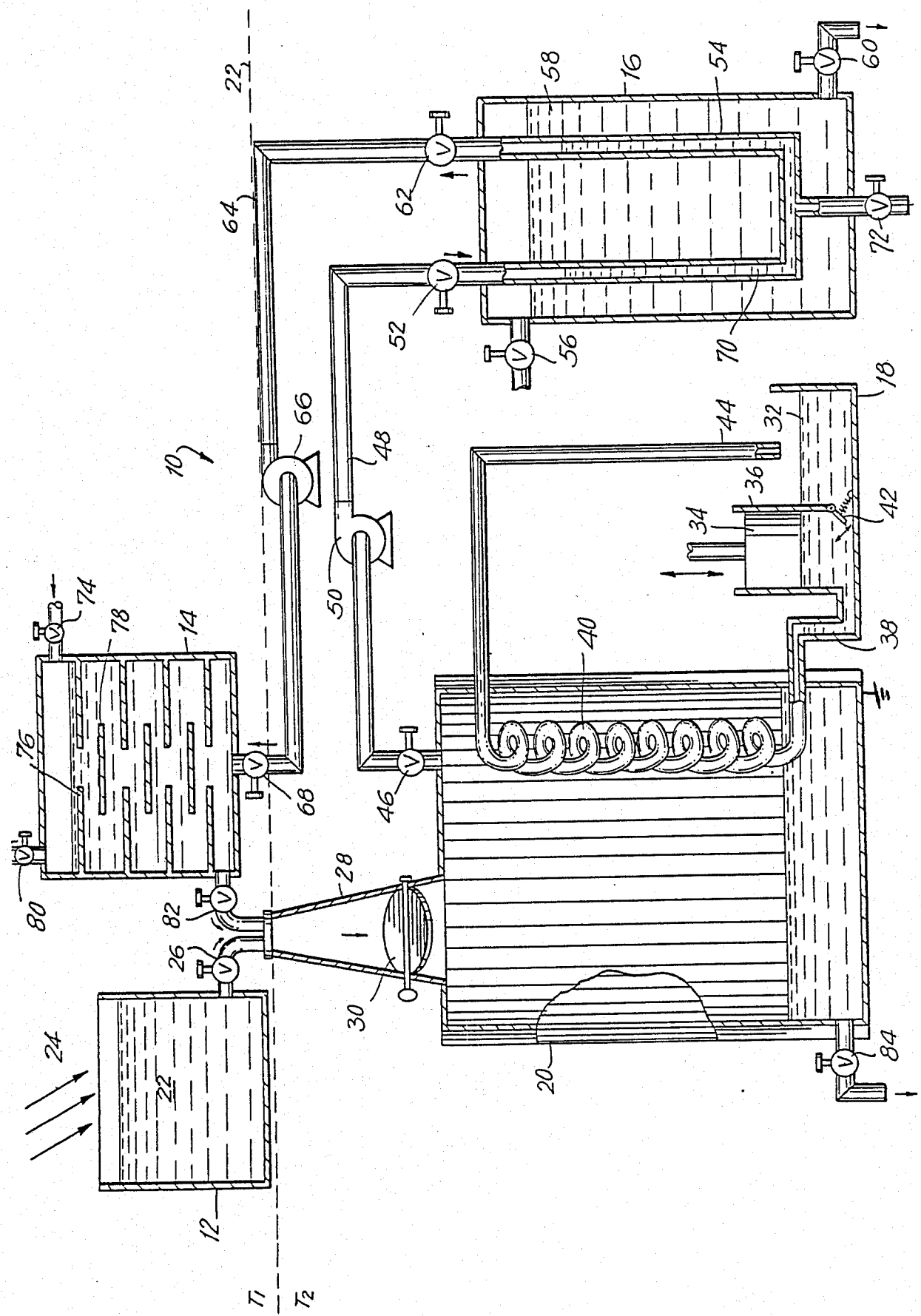

METHOD OF AND ARRANGEMENT FOR GENERATING HYDROGEN

BACKGROUND OF THE INVENTION

1. Field of the Invention

This invention relates to a method of and arrangement for generating hydrogen with the assistance of cryogenic temperature and subatmospheric pressure conditions and with the aid of light.

2. Description of Related Art

Hydrogen is generally produced commercially by the action of steam on carbon, iron or carbon monoxide, or by the decomposition of certain hydrocarbons with heat, or by the electrolysis of water, or by the displacement of hydrogen from acids by certain metals, or by the action of sodium or potassium hydroxide on aluminum. All of these commercial methods have required very substantial expenditures of money and the use of costly and sophisticated equipment. It would be highly desirable to provide a much simpler, less expensive and less sophisticated method of manufacturing hydrogen on a commercial scale for use as a fuel.

SUMMARY OF THE INVENTION

1. Objects of the Invention

Accordingly, it is a general object of this invention to overcome the prior art drawbacks of producing hydrogen on a commercial scale.

It is another object of this invention to provide a novel and improved method of and arrangement for generating hydrogen for use as a fuel.

Still another object of this invention is to provide a reliable method and arrangement which can be used for large-scale commercial production of hydrogen.

Yet another object of this invention is to provide a method and arrangement of the character described which is both efficient and economical in operation.

It is another object of this invention to provide a method of and arrangement for generating hydrogen which requires a minimum of sophisticated control equipment.

An additional object of this invention is to operate a method of and arrangement for generating hydrogen in accordance with a unique cycle.

2. Features of the Invention

In keeping with these objects and others which will become apparent hereinafter, one feature of the invention resides, briefly stated, in an arrangement for, and method of, generating gaseous diatomic hydrogen in a series of steps. As an initial step, photons in light, such as sunlight, incandescent light, floodlights, etc., when directed toward water, cause at least some of the water molecules ($H_2O$) to change momentarily, e.g., for a time less than two seconds, into hydroride ($OH^H$). The term "hydroride" denotes an excited water molecule composed of one oxygen atom bound to a single hydrogen hydride, herein given the script of $OH^H$.

Thereupon, the hydroride is quickly cooled in a time less than two seconds to cryogenic temperatures below $-100°$ F., which cryogenic temperatures stabilize the hydroride so that it can exist for a time much greater than two seconds, e.g., on the order of six minutes or longer. The cryogenic temperatures are provided by any cooling liquid such as liquid nitrogen, liquid oxygen, liquid helium, or any liquid which can remain in the liquid state at such cryogenic temperatures below $-100°$ F., The stabilized hydroride is then subjected to a subatmospheric pressure condition, e.g., from about ⅔ to about 1/10 atmosphere, to thereby yield diatomic oxygen ($O_2$) and hydrogen hydride ($H^H$). The term "hydrogen hydride" denotes a form of hydrogen having two protons within its nucleus with two electrons around it, herein given the script of $H^H$.

The hydrogen hydride is itself unstable and, therefore, to maintain its existence, the hydrogen hydride can either be subjected to cryogenic temperatures below $-100°$ F., or, in the preferred embodiment where the hydrogen hydride is scheduled to be reacted with water at ambient temperatures on the order of $40°$ F., the hydrogen hydride is subjected to ambient temperatures as well as superatmospheric pressure from about two to ten times atmospheric pressure, the superatmospheric pressure thereby providing the stabilization for the hydrogen hydride, as well as any hydrorides produced by the reaction of hydrogen hydride and water.

The stabilized hydrogen hydride, during its reaction with water, yields the desired diatomic hydrogen ($H_2$) and additional hydroride ($OH^H$). This additional hydroride is thereupon recycled so as to be subjected to the above-described cryogenic temperature and subatmospheric pressure conditions to thereby yield additional diatomic oxygen and additional hydrogen hydride, with the latter being reacted with water to produce even more diatomic hydrogen and hydroride. The diatomic hydrogen and diatomic oxygen are removed.

The above-described cycle is continuously repeated. The initial reaction of generating hydroride by the action of light photons with water is used at the start of the cycle and to furnish any additional hydroride that may be subsequently required.

The method and arrangement of the character described is efficient and economical in operation. A minimum of sophisticated control equipment is required. Hence, this method and arrangement are highly suited for large-scale commercial production of hydrogen for use as an alternate and inexpensive source of energy.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawing.

BRIEF DESCRIPTION OF THE DRAWING

The single figure is a partly sectioned, partly broken-away, diagrammatic view of an arrangement for generating hydrogen in accordance with the method of this invention.

DESCRIPTION OF THE PREFERRED EMBODIMENT

Referring now to the single figure, reference numeral 10 generally identifies the overall arrangement for generating hydrogen in accordance with the method of this invention. The arrangement 10 comprises a water tank 12, a water tower 14, a filter chamber 16, a cooler chamber 18 and a main treatment vessel 20. The arrangement 10 is preferably divided into two temperature zones $T_1$ and $T_2$ by a barrier, e.g., a Mylar (Trademark) fabric diagrammatically represented by the dashed line 22.

The temperature zone $T_1$ is at ambient temperature, i.e., exposed to the prevailing earth temperature. The temperature zone $T_2$ is maintained at a predetermined cooler temperature, preferably in the range from about $-100°$ F. to about $-170°$ F. The water tank 12 and water tower 14 are located in ambient temperature zone $T_1$, and the filter chamber 16, cooler chamber 18 and main treatment vessel 20 are located in colder temperature zone $T_2$.

The water tank 12 contains a pool of water 22 therein. The upper surface of the water 22 is exposed to light rays, such as sunlight, diagrammatically represented by the arrows 24. The photons in the light impinge on the water molecules ($H_2O$) and cause at least some of them to momentarily change into a hydroride molecule ($OH^H$) having an average lifetime of less than two seconds. Being unstable, at least some of the hydroride molecules release the energy of the photons into the environment as heat and revert back to a stable water molecule. However, a small quantity of the liquid hydroride is stabilized by being subjected to cryogenic temperatures and/or superatmospheric pressures and, to that end, the liquid hydroride and the water are continuously conducted through opened valve 26 into a funnel-shaped drop pipe 28, whereupon the liquid hydroride is quickly cooled and stabilized in less than two seconds to solid hydroride due to the cold temperature of zone $T_2$. The funnel shape of drop pipe 28 tends to prevent the solidified hydroride from sticking to the side walls of the drop pipe and eventually clogging the same. An opened valve 30 admits the solid hydroride into the vessel 20.

The solid hydroride is subjected to a cryogenic temperature condition by conducting a predetermined amount of a cooling liquid, such as liquid nitrogen, into heat-exchanging relationship with the solid hydroride. The liquid nitrogen 32 is contained in the cooler chamber 18. A reciprocably-movable piston 34 is mounted in a metering chamber 36 which is in fluid communication with the cooler chamber 18. When moved downwardly, the piston 34 is operative to conduct a metered amount of the liquid nitrogen 32 from the cooler chamber 18 through a conduit 38 and into a heat exchanger or evaporator coil 40. During the downward movement of the piston 34, a normally-open spring-biased valve 42 is closed by hydraulic pressure to block off fluid communication between the cooler chamber 18 and the metering chamber 36. This valve action insures that the predetermined amount of the liquid nitrogen is indeed conveyed to the coil 40, and not returned to the liquid nitrogen supply in chamber 18. When the liquid nitrogen in the evaporator coil 40 evaporates, heat is withdrawn from the solid hydroride, thereby cooling the latter to cryogenic temperatures on the order of $-300°$ F.

Gaseous oxygen ($O_2$) is also located within the treatment vessel 20. This gaseous oxygen is typically left over from a previous cycle, as explained below, or can be separately charged into the vessel 20, particularly for the initial cycle. When the liquid nitrogen in the evaporator coil 40 cools the solid hydroride to a cryogenic temperature, the gaseous oxygen is also cooled and converted to liquid oxygen. The condensation of the gaseous oxygen into liquid oxygen in the closed vessel 20 causes the pressure therein to drop to a subatmospheric pressure condition, preferably in the range from about ⅔ to about 1/10 of an atmosphere.

Hence, when the hydroride is subjected in vessel 20 to a cryogenic temperature and a subatmospheric pressure condition, the hydroride disassociates to generate diatomic oxygen ($O_2$) and hydrogen hydride ($H^H$) which is also unstable and exists for average lifetimes of less than two seconds under ambient temperature and pressure conditions. This disassociation reaction is accompanied by a withdrawal of heat from the circumambient region surrounding the vessel 20, and a conduction of said heat through the walls of the vessel. The heat is conducted from the cold temperature zone $T_2$ (in the range of $-100°$ F. to $-170°$ F.) to the interior of the vessel 20 (temperature on the order of $-300°$ F.). In view of the fact that large amounts of heat energy (BTU) pass at a rapid rate through the vessel walls under cryogenic conditions, it is necessary to minimize the number of BTU's per second which pass through each square inch of the vessel walls; or otherwise, the vessel walls will tend to fatigue and fail, particularly after prolonged usage. Hence, it is preferable to constitute vessel walls of lead, or copper, or a tin and lead alloy, or other non-ferrous metal or alloy material. The size of the chamber can be greatly increased to reduce the amount of energy exchange through each square inch of vessel wall, or, preferably, in a compact plant, the vessel walls are to be pleated or corrugated. In addition, non-illustrated heat fins can be mounted on the vessel walls to increase the surface area thereof.

The liquid nitrogen in the coil 40 which has evaporated is returned to the cold temperature zone $T_2$, whereupon the evaporated nitrogen is liquefied and is returned to the cooler chamber 18 with the aid of the return pipe 44. The piston 34 is raised to empty the evaporator coil of any liquid nitrogen still remaining therein. The raising of the piston 34 causes the liquefied oxygen and the solid hydrogen hydride to warm up, because the interior of the vessel 20 is, for the moment, not being cooled to cryogenic temperatures. Eventually, the boiling point of liquid oxygen is reached, and the gaseous oxygen begins to rise and to entrain the now-gaseous hydrogen hydride.

With the outlet valve 46 now opened, some of the gaseous oxygen and the entrained hydrogen hydride flow through the opened valve 46 into the conduit 48 with the assistance of the pump 50. Some of the gaseous oxygen remains in the vessel 20 for the next cycle where the gaseous oxygen is used to reduce the pressure in the vessel 20, as described above.

The pump 50 delivers the gaseous oxygen and entrained hydrogen hydride through an opened valve 52 into a trap 54 located within the filter chamber 16. An inlet valve 56 charges the filter chamber 16 with any cold medium, preferably liquid nitrogen 58. The outlet valve 60 empties the liquid nitrogen if desired. The gaseous oxygen entering the trap 54 is liquefied because of the cold temperature of the liquid nitrogen surrounding the trap. The gaseous hydrogen hydride entering the trap 54 is not trapped therein, and continues to be conducted through the opened valve 62 into the conduit 64 with the assistance of the pump 66 for delivery to the water tower 14 via the opened inlet valve 68. If desired, the liquid oxygen 70 in the trap 54 can be tapped and emptied by the opened valve 72.

Water is admitted into the upper portion of the water tower 14 via inlet valve 74. A set of baffles 76, 78 is mounted in staggered relationship so as to define a tortuous path or maze for the water to be conducted along. The gaseous hydrogen hydride admitted at the lower portion of the water tower 14 via inlet valve 68 is conducted in countercurrent direction along the maze so that the hydrogen hydride is intimately mixed with the water. The maze is operative to prevent the hydrogen hydride from escaping through the upper valves 74 and 80. The temperature of the water in the water tower is at ambient temperature levels, preferably in the range from about 31° F. to about 100° F. The water admitted into the tower 14 is pressurized, and the pressure within the tower is on the order of about two atmospheres to about ten atmospheres in order to stabilize the aforementioned unstable hydrogen hydride and any unstable hydroride contained therein.

The hydrogen hydride reacts with the water in the water tower under the above-described temperature and pressure conditions to thereby generate diatomic hydrogen gas ($H_2$) and liquid hydroride ($OH^H$). The hydrogen gas escapes through the upper outlet valve 80, whereupon it is collected for eventual use. The liquid hydroride is conducted via the opened valve 82 into the drop pipe 28, where it is recycled to the treatment vessel 20. The recycled hydroride is used to continue the process. From time to time, and as needed, the hydroride generated by photon action in the water tank 12 is used to replenish the supply of hydroride fed to the vessel 20. The valve 84 at the bottom of the vessel 20 can be used to remove any excess liquid oxygen or water which collects at the bottom of the vessel.

The operation cycle described above, which can be performed in about six minutes, is repetitively performed to thereby generate diatomic hydrogen in large-scale commercial quantities. The method can be summarized by the following equations:

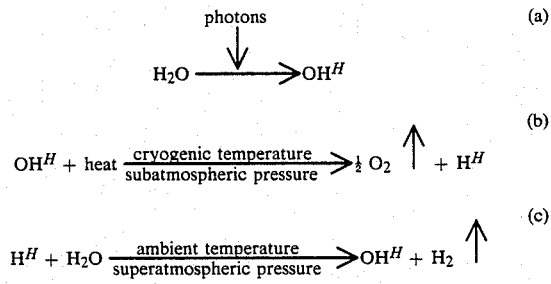

The reaction of equation (a) occurs in the water tank 12. The reaction of equation (b) occurs in the treatment vessel 20. The reaction of equation (c) occurs in the water tower 14.

In a preferred embodiment to handle the six-minute cycle described above, the treatment vessel measures about 3'×3'×7'; and the water tower 14 has a volume of about 12 cubic feet. The preferred embodiment will produce about 3¾ lbs. of hydrogen every hour, or 87½ lbs. of hydrogen per day at a rate of 10 cycles per hour. At a rated efficiency of about 6% to cover heat losses to the atmosphere and other losses, approximately 45 liters of water and approximately 4 kilograms of recyclable hydrogen hydride are needed for each cycle. Of course, the container dimensions and material quantities stated herein are merely exemplary and can be changed to meet the requirements of any particular installation. The various valves can be manually (or, preferably, automatically) operable. The piston 34 is preferably driven by a non-manual power source such as a motor. The liquid oxygen removed by valves 72 and 84 can be separately sold as a by-product of this process.

In another variation of this invention, the water tank 12 which is exposed to the action of light photons can be maintained at cryogenic temperature conditions, whereby the conversion of the water ice to hydroride still occurs. In this case, the water ice with entrained hydroride is admitted into the vessel 20. When the built-up of water ice at the bottom of the vessel 20 is undesirably great, a non-illustrated auger can be used to expel the water ice from the vessel 20.

It will be understood that each of the elements described above, or two or more together, also may find a useful application in other types of constructions differing from the types described above.

While the invention has been illustrated and described as embodied in a method of and arrangement for generating hydrogen, it is not limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A method of generating diatomic hydrogen, comprising the steps of:
   (a) generating diatomic oxygen and hydrogen hydride by subjecting hydroride to cryogenic temperature and subatmospheric pressure conditions;
   (b) generating diatomic hydrogen and hydroride by reacting the hydrogen hydride generated in step (a) with water;
   (c) recycling the hydroride generated in step (b) for use in step (a); and
   (d) removing the diatomic hydrogen generated in step (b).

2. The method as defined in claim 1, wherein step (a) is performed at cryogenic temperatures on the order of the boiling point of liquid nitrogen and at subatmospheric pressures less than ⅔ of an atmosphere.

3. The method as defined in claim 1, wherein step (a) is performed by removing environmental heat from the circumambient region surrounding the hydroride.

4. The method as defined in claim 1, wherein step (a) includes the step of conducting a predetermined amount of a cooling liquid into heat-exchanging relationship with the hydroride, and the step of evaporating the cooling liquid to thereby cool the hydroride to the cryogenic temperature condition.

5. The method as defined in claim 4, wherein step (a) includes the step of liquefying the diatomic oxygen in a vessel in which the hydroride is contained, said liquefying step being operative to reduce the pressure in the vessel to the subatmospheric pressure condition.

6. The method as defined in claim 5; and further comprising removing liquefied oxygen from the vessel.

7. The method as defined in claim 5, wherein step (a) includes the step of withdrawing the cooling liquid away from its heat-exchanging relationship with the hydroride and the liquefied oxygen, and the step of waiting for the liquefied oxygen to boil into gaseous oxygen which entrains the hydrogen hydride and removes the same from the vessel.

8. The method as defined in claim 7; and further comprising the step of separating the hydrogen hydride from the gaseous oxygen.

9. The method as defined in claim 1, wherein step (b) is performed at ambient temperature and superatmospheric pressure conditions.

10. The method as defined in claim 9, wherein step (c) includes the step of cooling the liquid hydrogen hydride generated at ambient temperature conditions in step (b) to solid hydrogen hydride.

11. The method as defined in claim 1, wherein step (b) is performed at ambient temperatures on the order of 31° F. to about 100° F. and superatmospheric pressure conditions on the order of about 3 to about 10 atmospheres.

12. The method as defined in claim 1, wherein step (b) is performed by conducting the hydrogen hydride along a maze-like path in countercurrent direction to the conduction of the water toward the hydrogen hydride.

13. The method as defined in claim 1; and further comprising the step of generating hydroride by subjecting water under ambient temperature and superatmospheric pressure conditions to the action of light photons, and wherein step (a) is performed at least in part by using the hydroride generated by photon action.

14. The method as defined in claim 1, wherein steps (a), (b), (c) and (d) are repeated cyclically to generate diatomic hydrogen.

15. An arrangement for generating diatomic hydrogen, comprising:
(a) a vessel;
(b) inlet means for admitting hydroride into the vessel;
(c) environmental means for cooling the hydroride in the vessel to cryogenic temperature conditions, and for reducing the pressure in the vessel to subatmospheric pressure conditions, to thereby generate diatomic oxygen and hydrogen hydride;
(d) a water tank;
(e) means for conducting the hydrogen hydride into the presence of the water in the tank, to thereby generate diatomic hydrogen and hydroride;
(f) means for recycling the hydroride generated in the water tank to the vessel; and
(g) outlet means for removing the diatomic hydrogen generated in the water tank.

16. The arrangement as defined in claim 15, wherein the vessel has corrugated wall portions.

17. The arrangement as defined in claim 15, wherein the environmental means includes means for conducting a predetermined amount of a cooling liquid into heat-exchanging relationship with the hydroride.

18. The arrangement as defined in claim 15; and further comprising means for separating the hydrogen hydride from the diatomic oxygen.

19. The arrangement as defined in claim 15, wherein the water tank includes means for conducting a pressurized stream of water along a maze-like path through the tank, and wherein the means for conducting the hydrogen hydride conducts the latter in countercurrent direction along the maze-like path.

20. The arrangement as defined in claim 15; and further comprising a chamber having water exposed to the action of light photons, to thereby generate hydroride; and also comprising means for conducting the hydroride generated by photon action to the vessel.

* * * * *